United States Patent
Wen et al.

(10) Patent No.: US 6,569,920 B1
(45) Date of Patent: May 27, 2003

(54) TITANIUM DIOXIDE SLURRIES HAVING IMPROVED STABILITY

(75) Inventors: Fu-Chu Wen, Severna Park, MD (US); Duen-Wu Hua, Severna Park, MD (US)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 0 days.

(21) Appl. No.: 09/639,860

(22) Filed: Aug. 16, 2000

(51) Int. Cl.$^7$ ................................................ C08K 9/00
(52) U.S. Cl. ..................... 523/205; 524/437; 524/497
(58) Field of Search ...................... 523/205; 524/437, 524/497

(56) References Cited

U.S. PATENT DOCUMENTS

| | | |
|---|---|---|
| 3,383,231 A | 5/1968 | Allan |
| 3,536,510 A | 10/1970 | Allen et al. |
| 3,547,671 A | 12/1970 | Hitzemann et al. |
| 3,647,495 A | 3/1972 | Cline |
| 3,772,046 A | 11/1973 | Knapp et al. |
| 4,214,913 A | 7/1980 | Glaeser |
| 4,280,849 A | 7/1981 | Howard et al. |
| 4,288,254 A | 9/1981 | Gladu |
| 4,868,228 A | 9/1989 | Gonnet et al. |
| 4,978,396 A | 12/1990 | Story |
| 5,356,470 A | 10/1994 | Ott et al. |
| 5,431,956 A * | 7/1995 | Robb et al. .................. 427/220 |
| 5,432,238 A | 7/1995 | Egraz et al. |
| 5,432,239 A | 7/1995 | Egraz et al. |
| 5,653,793 A | 8/1997 | Ott et al. |
| 5,746,819 A | 5/1998 | Kostelnik et al. |
| 5,824,145 A | 10/1998 | Marganski et al. |
| 5,824,146 A | 10/1998 | Ott et al. |

FOREIGN PATENT DOCUMENTS

| | | |
|---|---|---|
| CH | 686570 | 1/1953 |

* cited by examiner

*Primary Examiner*—Edward J. Cain
(74) *Attorney, Agent, or Firm*—Kalow & Springut LLP; David A. Kalow; William D. Schmidt

(57) ABSTRACT

The present invention provides slurries and methods of making slurries having improved stability comprising below about 78 weight-percent rutile titanium dioxide based on the total weight of the slurry, an amorphous alumina compound surface treated titanium dioxide, a polyacrylic acid dispersing agent having a molecular weight in the range of from about 2,000 to about 5,000 that is neutralized with a neutralizing agent having a monovalent group, and water; wherein the slurry has a pH of from about 6 to about 8. The slurries of the present invention resist gel formation.

30 Claims, No Drawings

TITANIUM DIOXIDE SLURRIES HAVING IMPROVED STABILITY

BACKGROUND

Titanium dioxide ($TiO_2$) pigments are important pigments in the manufacture of paints, plastics, coatings and paper laminates. Titanium dioxide ($TiO_2$) is produced commercially in two crystalline polymorphic forms, namely the rutile form which can be produced by both the chloride and sulfate processes and the anatase form which is produced by the sulfate process. Both of these processes are well known in the art. Generally, in the "chloride" process, rutile crystal is produced while in the sulfate process, both rutile and anatase crystals can be produced.

With regards to rutile $TiO_2$ it is known to add volatile aluminum compounds in the oxidation reaction of titanium tetrachloride ($TiCl_4$), primarily to increase the rutile content of the $TiO_2$ pigment being produced. Typically, the amount of aluminum compound added is sufficient to form about 1 to 1.5 weight-percent alumina based on the $TiO_2$ pigment, and this amount helps achieve greater than 99 weight-percent rutile in the pigment. The resulting $TiO_2$ from the oxidation reaction is then subjected to certain finishing and grinding treatments depending on the desired type of final $TiO_2$ pigment product.

Finishing and grinding treatment often involve the steps of: a) dispersing the $TiO_2$ particles in an aqueous medium to form a slurry having a relatively low $TiO_2$ solids concentration; b) precipitating hydrous inorganic oxide coating, such as for example, alumina, silica and/or other compounds, onto the surface of the $TiO_2$ particles; c) recovering the inorganic oxide surface-treated $TiO_2$ particles from the aqueous medium by filtering; d) washing the $TiO_2$ particles to remove by-product salts and impurities; e) drying the washed $TiO_2$ pigment particles; f) dry-grinding the dried $TiO_2$ pigment particles to a desired particle size using a fluid-energy mill, and optionally, if an aqueous $TiO_2$ pigment slurry is desired, g) dispersing the pigment product in water to produce a slurry typically having a $TiO_2$ solids content of below about 78 weight-percent.

The titanium dioxide may be finished depending on the end-use application (i.e., paint, plastic etc). For example, some finishing steps involve wet surface treatments with other inorganic metal oxides, such as alumina, silica, phosphate, $CeO_2$ and the like, for processibility and/or final applications as known in the art. The surface treatment steps then follow by drying and grinding. These steps will give the finished pigment the desired particle size, distribution and properties.

Generally, concentrated rutile $TiO_2$ slurry products are made by dispersing the finished pigment product in water to produce a slurry having a $TiO_2$ solids content below about 78 weight-percent. Slurries with solids contents greater than 78 weight-percent typically exhibit negative effects on stability and other physical properties (i.e. difficultly pumping, flocculation, gellation and poor or no fluidity over time).

Slurry stability may be further reduced when the rutile $TiO_2$ is treated with an inorganic oxide such as amorphous alumina. Dispersants are often added to such slurries to make it maintain viscosity and storage stability so that it can easily be handled during transport from the $TiO_2$ manufacturers to the customers. However, some prior art slurries, even with dispersants, tend to gel during conventional storage making them difficult to pump and transport.

Based on the foregoing, there is a need for titanium dioxide slurries having improved stability which are useful in the manufacture of paper laminates, plastic, paint and other coatings systems.

SUMMARY OF THE INVENTION

The present invention relates to photodurable slurries having improved stability that comprise: i) below about 78 weight-percent rutile titanium dioxide based on the total weight of the slurry, with a surface treatment comprising an amorphous alumina compound; ii) a polyacrylic acid dispersing agent having a weight average molecular weight (Mw) in the range of from about 2,000 to about 5,000, that is neutralized with a neutralizing agent having a monovalent group, and iii) water, wherein the slurry has a pH of from about 6 to about 8.

Compared to prior art slurries, the slurries of the present invention exhibit improved stability and a reduced tendency toward gellation over time. Accordingly, one advantage of the stable slurries of the present invention is that they can be easily handled and transported to other sites such as a paper laminate manufacturing facilities, while they maintain free flowing and pumpable characteristics.

In another embodiment, the present invention provides methods of making slurries having improved stability comprising mixing rutile titanium dioxide, surface-treated with an amorphous alumina compound, with water and a polyacrylic acid dispersing agent having a molecular weight in the range of from about 2,000 to about 5,000 under conditions so as to form the slurry, wherein the dispersing agent is neutralized with a neutralizing agent having a monovalent group, the mixing is performed at a pH of from about 6 to about 8 and wherein the rutile titanium is present in an amount below about 78 weight-percent based on the total weight of the slurry.

The improved stable slurries of the present invention enable many end-use improvements and expand the limits within which many end users, such as paper manufacturers, were heretofore required to operate.

DETAILED DESCRIPTION OF THE INVENTION

In preparing the preferred embodiments of the present invention, various alternatives may be used to facilitate the objectives of the invention. These embodiments are presented to aid in an understanding of the invention and are not intended to, and should not be construed to, limit the invention in any way. All alternatives, modifications and equivalents that may become obvious to those of ordinary skill upon a reading of the present disclosure are included within the spirit and scope of the present invention.

Titanium Dioxide Slurries

The present invention provides slurries with improved stability. Slurries of the present invention can be shipped to manufacturers for use in the making of products, such as paper laminates, paints, and coatings, or for use in other pigmentary applications. Alternatively, the slurries can be subjected to further processing such as wet milling, for example in a sandmill or a horizontal media mill, to provide a slurry with a more desirable mean pigmentary particle size or other attribute.

Slurries of the present invention have been observed to be, when subjected to further processing, more easily processed than prior slurries. The slurries of the present invention have improved stability properties and are more readily pumped, dispersed, show reduced tendency to flocculate or gel and maintain fluidity over time. These latter properties can be attributed to a number of factors including solids content, pH of the slurry and the dispersant used.

The present invention provides slurries of rutile $TiO_2$ having below about 78 weight-percent solids content. Slurries with solids content greater than 78 weight-percent are typically unstable and show increased tendency to gel and do not maintain fluidity over time. Slurries of the present invention have a solids content preferably in the range of about 65 weight-percent to about 75 weight-percent rutile titanium dioxide based on the total weight of the slurry. Slurries with $TiO_2$ concentrations lower than this range tend to settle on standing.

Titanium dioxide used in making the slurry is produced commercially in two crystalline forms, namely the rutile form which is usually produced by the chloride and sulfate processes and the anatase form which is usually produced by the sulfate process. Both of these well known processes are generally described in U.S. Pat. No. 2,559,638 this basic description is incorporated herein by reference. The present invention is applicable to rutile $TiO_2$.

Preferably the titanium dioxide is surface treated with an amorphous alumina compound to enhance the photodurability of the pigment. There are numerous surface treatment processes known to those skilled in the art. One particularly preferred surface treatment is wet-treatment with metal oxides, such as for example, alumina and phosphate.

Suitable amorphous alumina compounds useful for surface treatment of the titanium dioxide include water soluble alkali metal aluminates, such as for example, amorphous sodium or potassium aluminate, aluminum sulfate or aluminum chloride. Most preferably, the water soluble alumina compound is sodium aluminate.

The weight percent of the amorphous alumina compound can vary depending on the amount of amorphous alumina substantially coating the titanium dioxide. Preferably, the amorphous alumina compound comprises below about 5.5 weight-percent alumina from wet treatment of the titanium dioxide based on the total weight of titanium dioxide. More preferably, the amorphous alumina compound comprises from about 1 weight-percent to about 5 weight-percent amorphous alumina.

Optionally, the titanium dioxide used in making the slurry can be surface treated with a phosphate compound as well. Phosphate compounds include water soluble phosphate compounds capable of coating the rutile titanium dioxide under the operating conditions employed. Suitable phosphate compounds for use in the present invention include tetrapotassium pyrophosphate, sodium polyphosphate, tetrasodium pyrophosphate (Tetron™), sodium tripolyphosphate, potassium tripolyphosphate, sodium hexametaphosphate (Calgon™), phosphoric acid, and the like. Most preferably, the water soluble phosphate compound is phosphoric acid.

The weight percent of the phosphate compound can vary depending on the layer of phosphate desired. Preferably, the phosphate compound comprises from about 0.2 weight-percent to about 3.0 weight-percent $P_2O_5$ based on the weight of titanium dioxide.

It will be understood by those skilled in the art that other inorganic metal oxides (e.g. hydrous metal oxides) can also be used to substantially coat the titanium dioxide. Some examples of suitable inorganic metal oxides include silica, zirconia, $CeO_2$ and the like. These metal oxides can be used in a wide variety of weight-percentages easily determined by those skilled in the art.

In the most preferred embodiment of the present invention, the titanium dioxide pigment comprises rutile titanium dioxide treated with a high level of $P_2O_5$ and amorphous alumina. Such a pigment is available from Millennium Inorganic Chemicals, MD, USA under the name TiONA® RCL-722.

Slurry Dispersing Agents, pH and Viscosity

The $TiO_2$ slurries of the present invention include a dispersing agent to aid in viscosity, dispersibility, stability and resistance to flocculation. Suitable dispersing agents include polyacrylic acid. As used herein, polyacrylic acid includes polyacrylic acid derivatives. Some examples of polyacrylic acids and/or derivatives thereof include polyacrylic acid homopolymers, polyacrylic acid copolymers, and mixtures thereof. Preferably, the acrylic acid homopolymers and acrylic acid copolymers of the present invention include at least one comonomer selected from the group consisting of maleic acid, methacrylic acid, itaconic acid, crotonic acid, fumaric acid, acrylamide, acrylonitrile, ethylene, propylene, styrene and esters of the above acids, wherein the homopolymers or copolymers have been partially or completely neutralized with a neutralizing agent having a monovalent group. These dispersants can be present in amounts up to about 5 weight-percent. Preferably, the dispersants are present in amounts of from about 0.05 to about 2 weight-percent, more preferably from about 0.2 to about 1 or 2 weight-percent; and most preferably from about 0.2 to about 0.5 weight-percent based on the total weight of titanium dioxide.

Preferred polyacrylic acid dispersants or derivatives thereof useful in the practice of the present invention are produced by known processes of polymerization. These dispersants are more fully described in U.S. Pat. No. 5,746, 819, which disclosure in full is incorporated herein by reference.

The dispersing agent has an average molecular weight (Mw) in the range of from about 2,000 to about 5,000. Preferably, the dispersing agent has been partially or completely neutralized with a neutralizing agent having a monovalent group. The neutralizing agent comprising the monovalent group includes groups selected from alkali metal cations, ammonium, aliphatic or cyclic primary, secondary or tertiary amines. The most preferred monovalent cations are sodium and/or potassium.

The desired degree of neutralization can be achieved by neutralizing the polyacrylic acid dispersant or derivative thereof with the neutralizing agent. The polyacrylic acid dispersant or derivative thereof has acid sites which can be partially or completely neutralized with the neutralizing agent. Accordingly, one or more neutralizing agents having monovalent cations, such as for example Na or K ions, can be mixed in appropriate portions.

Non-polyacrylic acid derived dispersing agents have been found to suffer from several shortcomings, most notably, poorer than desirable viscosity, stability, foaming tendencies and a tendency to flocculate in their usage applications when compared to polyacrylic acid dispersants. Accordingly, the slurries of the present invention exhibit improved stability. Some improved stability properties include improved fluidity, viscosity, pumpability, dispersibility and reduced tendency to flocculate or gel over time.

For example, observed improvements in slurry stability include reduced tendency to gel over preferably, at least about 5 days, more preferably, at least about 20 days and most preferably, at least about 30 days. Such improved properties are due in part to the polyacrylic acid dispersant as well as the pH of the slurry.

Slurries of the present invention have a pH value preferably below about 8, and most preferably, from about 6 to about 8. The pH of the slurry is important. Slurries at higher or lower pH ranges tend to be unstable and show increased tendency to gel over time. Though the desired pH for any slurry depends on the final use of the slurry, high solids rutile slurries at pH values from about 6 to about 8 are especially advantageous.

The slurries produced by methods of the present invention can have viscosities spanning a wide range depending on the use of the slurry and the processing conditions and equipment that it will be subjected to (e.g. pumping, mixing, milling, filtering). The slurries of the present invention generally tend to become not readily pumpable at a Brookfield viscosity much greater than about 1500 cps, slurries having a Brookfield viscosity of less than about 1500 cps are preferred, more preferred are slurries with a Brookfield viscosity of less than about 1000 cps. At very low viscosities, rutile $TiO_2$ tends to unduly settle out of the slurries. Thus, slurries having Brookfield viscosities of between about 200 to about 1000 cps are most preferred. For purposes of the present application all Brookfield viscosities are given as measured using a Model LVT Brookfield viscometer with a number 3 spindle revolving at 60 rpm.

Preparing the Slurries

The present invention further relates to methods of making slurries having improved stability. The methods involve mixing rutile titanium dioxide surface-treated with an amorphous alumina compound, water and a polyacrylic acid dispersing agent having a molecular weight in the range of from about 2,000 to about 5,000 under conditions so as to form the slurry. The dispersing agent is neutralized with a neutralizing agent having a monovalent group and the mixing is performed at a pH of from about 6 to about 8.

Slurries of titanium dioxide can be made by methods well known in the art. As discussed above, the $TiO_2$ solids content is about 65 weight-percent to about 78 weight-percent rutile titanium dioxide based on the total weight of the slurry, with solids contents in the range of about 65 weight-percent to about 75 weight-percent being preferred. The titanium dioxide is surface treated with amorphous alumina and optionally a phosphate.

In one embodiment of the present invention, slurries having improved stability are prepared by mixing titanium dioxide surface treated with amorphous alumina, water, and a polyacrylic acid dispersing agent having a monovalent group as discussed above. Tap water or deionized water can be used for the method of the invention. Preferably, the mixing of the slurry is achieved using a Cowles type blade on a mixer of suitable horsepower. More preferably, the mixing includes adequate mixing to break up agglomerates. The most preferred mixing is high shear mixing.

Preferably, the pH of the slurry is from about 6 to about 8. The pH of the slurry can be adjusted to this desired pH range using methods known in the art. For example, if adjustment of the pH of the slurry becomes necessary, such adjustments can be made by simply adding the polyacrylic acid dispersing agent, a suitable acid or suitable base. Suitable acids include water soluble acids such as hydrochloric acid, sulfuric acid, phosphoric acid, nitric acid, and the like. Suitable bases include water soluble alkaline bases such as ammonia, sodium hydroxide or other suitable alkaline compounds.

In the most preferred embodiment of the present invention, the $TiO_2$ slurry having improved stability is produced by introducing the polyacrylic acid dispersing agent into water, adding the $TiO_2$ surface treated with an amorphous alumina under adequate mixing to break up agglomerates thereby producing a uniform, non-gelling slurry.

It is known or readily determinable by those skilled in the art that suitable conditions to form the slurry include parameters, such as for example, mixer settings, mixing and addition times, etc. These parameters can be adjusted or maintained at a range that will facilitate preparation of the slurries of the present invention.

The following examples are presented to aid in an understanding of the present invention and are not intended to, and should not be construed to, limit the invention in any way. All alternatives, modifications and equivalents that may become obvious to those of ordinary skill in the art upon a reading of the present disclosure are included within the spirit and scope of the invention.

EXAMPLES

The examples below demonstrate, among other things, that the slurries of the present invention have improved stability. The slurries of the present invention produced at pH from about 6.0 to about 8.0, using a polyacrylic acid dispersant having an average molecular weight in the range of from about 2,000 to about 5,000 resist gel formation.

Example 1

750 grams of tap water and 20 grams of Alcosperse-149 solution (40% active sodium polyacrylate, Mw: 2500, from Alco Chemical, TN) were mixed together in a 2000 ml plastic beaker for 5 minutes 1000 rpm using a model 90 Premier Lab Dispersator equipped with a 2 inch Cowles blade. 2000 grams of titanium dioxide dry pigment (TiONA® RCL-722 contains $P_2O_5$ and amorphous alumina based on weight of pigment, available from Millennium Inorganic Chemicals, MD) were slowly added at 1500 rpm. The slurry was mixed at 2000 rpm for 5 minutes. The solids were adjusted to 72.5%. Initial slurry viscosity was 366 and pH was 7.35. Slurry viscosity is below 1000 cps after 30 days and no gelling was observed at this time.

Example 2

750 grams of tap water and 17.78 grams of Narlex LD29 (polyacrylic acid homopolymer-45% active, Mw: 2000, commercially available from Alco Chemical, TN) solution were mixed together in a 2000 ml plastic beaker for 5 minutes 1000 rpm using a model 90 Premier Lab Dispersator equipped with a 2 inch Cowles blade. 2000 grams of titanium dioxide dry pigment (RCL-722) were slowly added at 1500 rpm. The slurry was mixed at 2000 rpm for 5 minutes. The solids were adjusted to 72.5%. Initial slurry viscosity was 292 cps and pH was 7.28. Slurry viscosity was below 1000 cps after 20 days and no gelling was observed at this time.

Example 3

750 grams of tap water and 16 grams of Tamol 1124 (functionalized polyacrylic acid copolymer-50% active, Mw: 2200, available from Rohm & Haas Co, PA) solution were mixed together in a 2000 ml plastic beaker for 5 minutes 1000 rpm using a model 90 Premier Lab Dispersator equipped with a 2 inch Cowles blade. 2000 grams of titanium dioxide dry pigment (RCL-722) were slowly added at 1500 rpm. The slurry was mixed at 2000 rpm for 5 minutes. The solids were adjusted to 72.5%. Initial slurry viscosity was 365 cps and pH was 7.19. Slurry viscosity was below 1000 cps after 20 days and no gelling was observed at this time.

Example 4

750 grams of tap water and 22.9 grams of Tamol 1254 (functionalized polyacrylate copolymer-50% active, Mw: 3500, available from Rohm & Haas Co, PA Mw: 3500) solution were mixed together in a 2000 ml plastic beaker for 5 minutes 1000 rpm using a model 90 Premier Lab Dispersator equipped with a 2 inch Cowles blade. 2000 grams of titanium dioxide dry pigment (RCL-722) were slowly added at 1500 rpm. The slurry was mixed at 2000 rpm for 5 minutes. The solids were adjusted to 72.5%. Initial slurry viscosity was 390 cps and pH was 7.36. Slurry viscosity was below 1000 cps after 20 days and no gelling was observed at this time.

COMPARATIVE EXAMPLE A 750 grams of tap water and 12.5 grams of Alcosperse-149 solution were mixed together in a 2000 ml plastic beaker for 5 minutes 1000 rpm using a model 90 Premier Lab Dispersator equipped with a 2 inch Cowles blade. 2000 grams of titanium dioxide dry pigment (RCL-722) were slowly added at 1500 rpm. The slurry was mixed at 2000 rpm for 5 minutes. The pH of the slurry was adjusted to 8.6 with 50% NaOH solution. Initial slurry viscosity was 370 cps, but gelled after 1 day, and remained gelled after 20 days.

COMPARATIVE EXAMPLE B 750 grams of tap water and 12.5 grams of Alcosperse-149 solution were mixed together in a 2000 ml plastic beaker for 5 minutes 1000 rpm using a model 90 Premier Lab Dispersator equipped with a 2 inch Cowles blade. 2000 grams of titanium dioxide dry pigment (RCL-722) were slowly added at 1500 rpm. The slurry was mixed at 2000 rpm for 5 minutes. The pH of the slurry was adjusted to 8.5 with 2-amino-2-mythyl-1-propanol (AMP-95). Initial slurry viscosity was 334, but gelled within 1 day, and remained gelled after 20 days.

COMPARATIVE EXAMPLE C 750 grams of tap water and 2.1 grams of 2-amino-2-mythyl-1-propanol solution and 6 grams of TKPP (tetrapotassium pyrophosphate-100% active, Canada Colors and Chemical Limited, Ontario) were mixed together in a 2000 ml plastic beaker for 5 minutes 1000 rpm using a model 90 Premier Lab Dispersator equipped with a 2 inch Cowles blade. 2000 grams of titanium dioxide dry pigment (RCL-722 from Millennium Inorganic Chemicals) were slowly added at 1500 rpm. The slurry was mixed at 2000 rpm for 5 minutes. Slurry initial pH was 7.77 and the viscosity was 600 cps, but gelled within 1 day, and remained in a gelled state after 20 days.

COMPARATIVE EXAMPLE D 750 grams of tap water and 22.9 grams of Tamol SG-1 (Mw: 13,000, functionalized polyacrylate copolymer-50% active,) solution were mixed together in a 2000 ml plastic beaker for 5 minutes 1000 rpm using a model 90 Premier Lab Dispersator equipped with a 2 inch Cowles blade. 2000 grams of titanium dioxide dry pigment (RCL-722) were slowly added at 1500 rpm. The slurry was mixed at 2000 rpm for 5 minutes. The solids were adjusted to 72.5%. Initial slurry viscosity was 1660 cps and pH was 7.1. Slurry gelled within 1 day and remained in a gelled state after 20 days.

COMPARATIVE EXAMPLE E 750 grams of tap water and 26.7 grams of Tamol 901 (Mw: 12,000) solution were mixed together in a 2000 ml plastic beaker for 5 minutes 1000 rpm using a model 90 Premier Lab Dispersator equipped with a 2 inch Cowles blade. 2000 grams of titanium dioxide dry pigment (RCL-722) were slowly added at 1500 rpm. The slurry was mixed at 2000 rpm for 5 minutes. The solids were adjusted to 72.5%. Initial slurry viscosity was 502 cps and pH was 7.48. Slurry gelled after 3 days and remained in a gelled state.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

What is claimed:

1. A slurry having improved stability comprising: i) below about 78 weight-percent rutile titanium dioxide based on the total weight of the slurry with a surface treatment comprising an amorphous alumina compound, ii) a polyacrylic acid dispersing agent having a molecular weight in the range of from about 2,000 to about 5,000, that is neutralized with a neutralizing agent having a monovalent group, and iii) water, wherein the slurry has a pH of from about 6 to about 8.

2. A slurry according to claim 1, wherein the slurry comprises from about 65 weight-percent to about 75 weight-percent rutile titanium dioxide.

3. A slurry according to claim 1, wherein the polyacrylic acid dispersing agent is selected from the group consisting of polyacrylic acid homopolymers, polyacrylic acid copolymers, and mixtures thereof.

4. A slurry according to claim 3, wherein the dispersing agent comprises a polyacrylic acid homopolymer or copolymer comprising at least one comonomer selected from the group consisting of maleic acid, methacrylic acid, itaconic acid, crotonic acid, fumaric acid, acrylamide, acrylonitrile, ethylene, propylene, styrene and esters of the acids, wherein the homopolymer or copolymer has been partially or completely neutralized with a neutralizing agent having a monovalent group.

5. A slurry according to claim 4, wherein the dispersing agent comprises an amount of from about 0.2 weight-percent to about 2.0 weight-percent based on the total weight of titanium dioxide.

6. A slurry according to claim 4, wherein the dispersing agent comprises an amount of from about 0.2 weight-percent to about 1.0 weight-percent based on the total weight of titanium dioxide.

7. A slurry according to claim 4, wherein the dispersing agent comprises an amount of from about 0.2 weight-percent to about 0.5 weight-percent based on the total weight of titanium dioxide.

8. A slurry according to claim 1, wherein the amorphous alumina compound comprises below about 5.5 weight-percent alumina from wet treatment of the titanium dioxide based on the total weight of titanium dioxide.

9. A slurry according to claim 1, wherein the amorphous alumina compound comprises from about 1 weight-percent to about 5 weight-percent alumina from wet treatment of the titanium dioxide based on the total weight of titanium dioxide.

10. A slurry according to claim 1, wherein the titanium dioxide is treated with a phosphate compound.

11. A slurry according to claim 10, wherein the phosphate compound comprises from about 0.2 weight-percent to about 3.0 weight-percent $P_2O_5$ based on the weight of titanium dioxide.

12. A slurry according to claim 1, wherein the slurry has a Brookfield viscosity of less than 1500 cps.

13. A slurry according to claim 12, wherein the viscosity is less than 1000 cps.

14. A slurry according to claim 12, wherein the viscosity is from about 200 to about 1000 cps.

15. A method of making a slurry having improved stability comprising i) mixing rutile titanium dioxide surface treated with an amorphous alumina compound; ii) water; and iii) a polyacrylic acid dispersing agent having a molecular weight in the range of from about 2,000 to about 5,000 under conditions so as to form the slurry, wherein the dispersing agent or derivative thereof is neutralized with a neutralizing agent having a monovalent group, the mixing is performed at a pH of from about 6 to about 8 and wherein the rutile titanium dioxide is present in an amount below about 78 weight-percent based on the total weight of the slurry.

16. A method according to claim 15, wherein the slurry comprises from about 65 weight-percent to about 75 weight-percent rutile titanium dioxide based on the total weight of the slurry.

17. A method according to claim 15, wherein the dispersing agent comprises an amount of from about 0.2 weight-percent to about 2.0 weight-percent based on the total weight of titanium dioxide.

18. A method according to claim 15, wherein the dispersing agent comprises an amount of from about 0.2 weight-percent to about 1.0 weight-percent based on the total weight of titanium dioxide.

19. A method according to claim 15, wherein the dispersing agent comprises an amount of from about 0.2 weight-percent to about 0.5 weight-percent based on the total weight of titanium dioxide.

20. A method according to claim 15, wherein the polyacrylic acid dispersing agent is selected from the group consisting of polyacrylic acid homopolymers, polyacrylic acid copolymers, and mixtures thereof.

21. A method according to claim 20, wherein the dispersing agent is a polyacrylic acid homopolymer or copolymer comprising at least one comonomer selected from the group consisting of maleic acid, methacrylic acid, itaconic acid, crotonic acid, fumaric acid, acrylamide, acrylonitrile, ethylene, propylene, styrene and esters of the acids, wherein the homopolymer or copolymer has been partially or completely neutralized with a neutralizing agent having a monovalent group.

22. A method according to claim 15, wherein the amorphous alumina compound comprises below about 5.5 weight-percent alumina from wet treatment of the titanium dioxide based on the total weight of titanium dioxide.

23. A method according to claim 22, wherein the amorphous alumina compound comprises from about 1 weight-percent to about 5 weight-percent alumina from wet treatment of the titanium dioxide based on the total weight of titanium dioxide.

24. A method according to claim 15, wherein the titanium dioxide is treated with a phosphate compound.

25. A method according to claim 24, wherein the phosphate compound comprises from about 0.2 weight-percent to about 3.0 weight-percent $P_2O_5$ based on the weight of titanium dioxide.

26. A method according to claim 15, wherein the slurry has a Brookfield viscosity of less than 1500 cps.

27. A method according to claim 26, wherein the viscosity is less than 1000 cps.

28. A method according to claim 26, wherein the viscosity is from about 200 to about 1000 cps.

29. A method of making a slurry having improved stability, comprising the steps of:
   a) mixing a polyacrylic acid dispersing agent having a molecular weight in the range of from about 2,000 to about 5,000, wherein the dispersing agent is neutralized with a neutralizing agent having a monovalent group in water to form a mixture; b) adding below about 78 weight-percent titanium dioxide surface-treated with an amorphous alumina to the mixture under conditions to form the titanium dioxide slurry having improved stability, wherein the slurry has a pH of from about 6 to about 8.

30. A method according to claim 29, wherein the mixing is high shear mixing.

* * * * *